April 16, 1929.  N. A. HALLWOOD  1,709,471
SCALE
Filed April 29, 1927
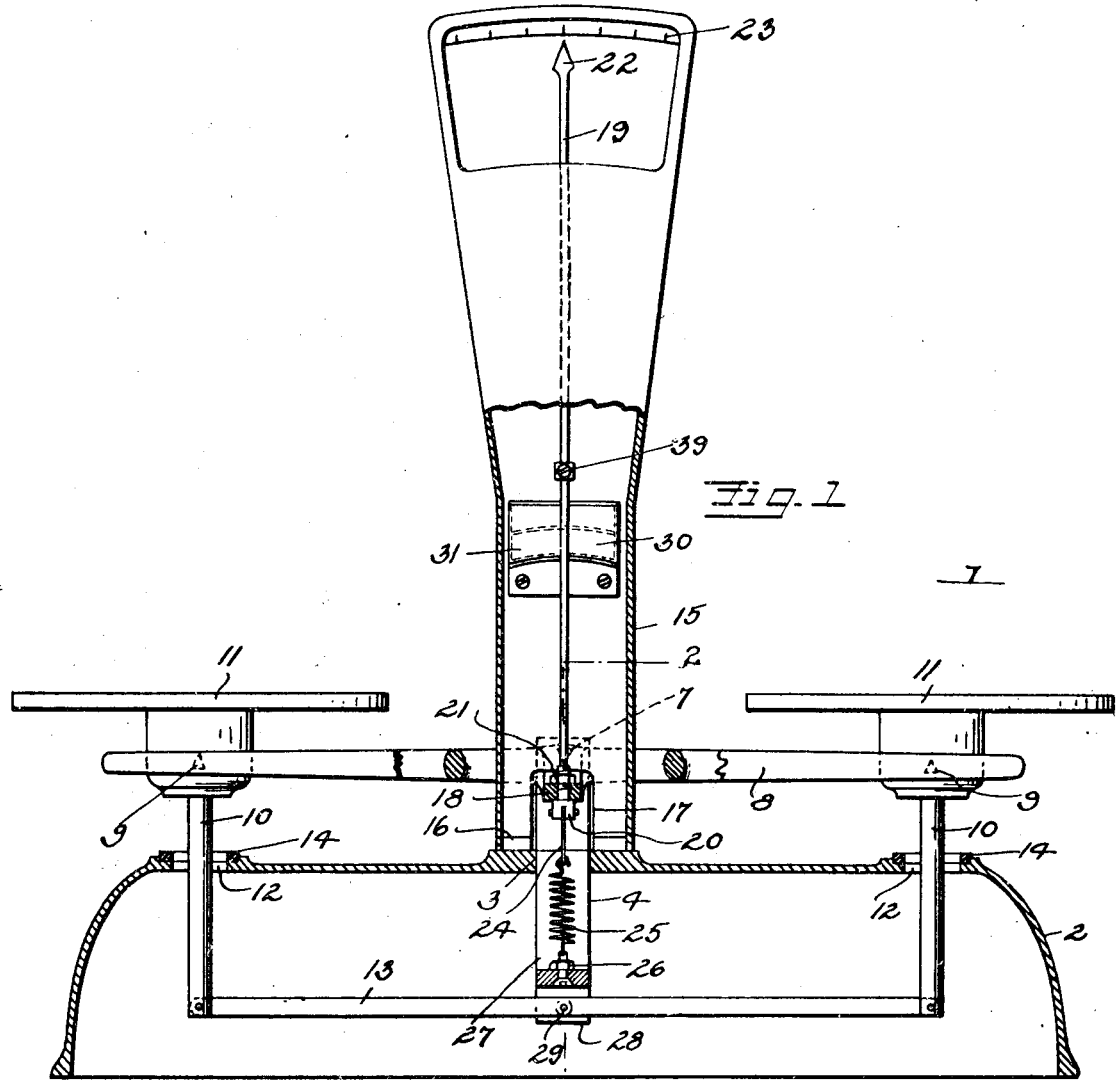
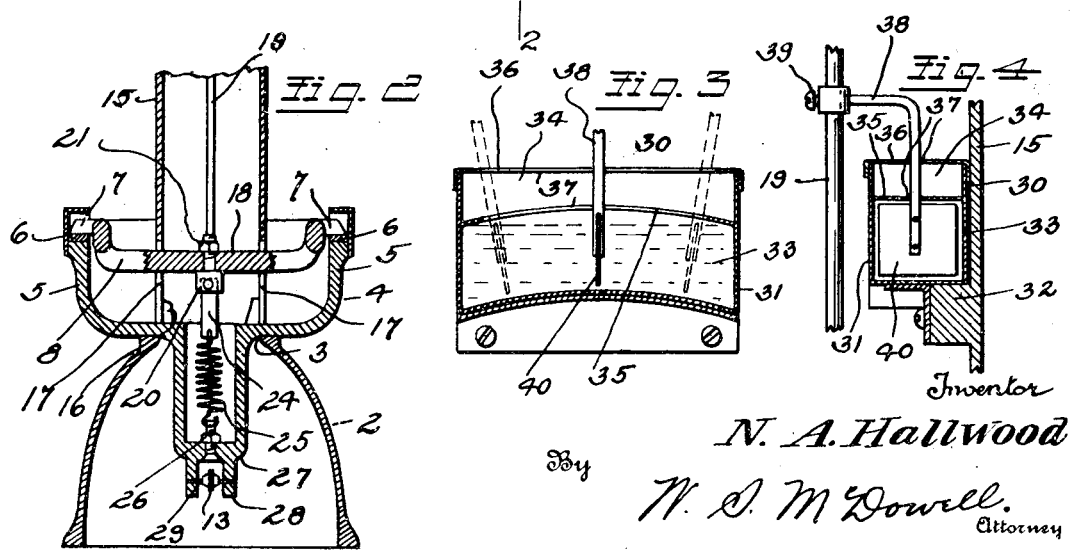
Inventor
N. A. Hallwood
By W. D. McDowell.
Attorney Patented Apr. 16, 1929.

1,709,471

UNITED STATES PATENT OFFICE.

NATHAN A. HALLWOOD, OF COLUMBUS, OHIO.

SCALE.

Application filed April 29, 1927. Serial No. 187,641.

This invention relates to improvements in scales, and, with reference to the more specific features thereof, is especially directed to scales of the so called even balance type, that is, to a scale wherein the beam member is pivoted centrally upon a supporting base and is adapted to assume a balanced position when substantially equal weights are applied to the opposite ends thereof.

Among the objects of the invention are: to provide an improved indicating means in connection with scales of this character for denoting clearly and conveniently when the beam member of the scale occupies a truly balanced position or the deflection thereof to either side of such a balanced position; in the provision of an improved spring mechanism for causing the beam member and its associated indicator to return to or maintain a desired position of balance; in the provision of a scale of the character set forth wherein the pivoted beam member is provided at a point substantially in registration with the pivotal mounting thereof with a fixed, elongated, perpendicularly extending indicator, which upon the oscillation of the beam member will move in unison with the latter over a graduated surface to enable the operating positions of the beam member to be readily determined; in the provision of an improved dash pot construction arranged in the indicator casing or tower and cooperative with the oscillatory indicator to control or dampen the vibration of the beam member and to bring the latter with desired acceleration to a position of balance or rest following the application of weights to said beam member; in the provision of a scale wherein friction and other technical losses set up by relatively moving parts of a scale are for all practical purposes eliminated, and in the provision generally of a scale of this type consisting of few and simple parts which are not likely to become out of order, require adjustment or occasion undue attention and repair to maintain the same in a proper working order, the scale being also constructed as to be unaffected by temperature changes or the relation of the base plane of the scale with respect to the horizontal.

Other objects will be in part obvious and in part pointed out hereinafter.

The invention consists in the novel features of construction, combinations of elements and arrangements of parts hereinafter described and claimed, it being understood, however, that various changes in the size, proportion, materials and arrangements of parts may be made in the construction of the scale from that herein specifically disclosed and illustrated, without departing from the scope of the invention.

In the accompanying drawing:

Figure 1 is a view in vertical section disclosing a scale constructed in accordance with the features of the present invention, Figure 2 is a transverse vertical sectional view taken on the plane indicated by the line 2—2 of Figure 1, Figure 3 is a vertical longitudinal sectional view taken through the improved dash pot construction, and Figure 4 is a vertical transverse sectional view taken through said dash pot construction and disclosing the associated indicator arm.

Referring more particularly to the accompanying drawing the numeral 1 designates my improved scale in its entirety. The scale is formed to embody a base 2, which is preferably in the form of an open bottomed hollow casting which has the upper surface thereof provided, at a point midway of its length, with a transversely extending slot 3. Resting upon the upper surface of the base 2 and projecting into the base by way of the slot 3, is a saddle casting 4, which has the transversely spaced arms 5 thereof provided with bearings 6 for the reception of the knife edge fulcrum 7 which are rigidly connected with and project laterally from the sides of a pivotally movable beam member 8.

The fulcrums 7 are, as usual, transversely aligned so that the beam member may oscillate in a substantially vertical plane above the top of the base 2. The opposed ends of the beam member 8 are provided with fixed knife edge bearings 9, which pivotally support a pair of longitudinally spaced stems 10, to which are connected at the upper ends thereof the usual weight receiving plates or platforms 11. The stems 10 project loosely through openings 12 provided in the opposite ends of the base 2, and the lower ends of the stems 10 are pivotally connected with the opposed ends of a check rod 13, which extends longitudinally of the base 2 and in parallelism with the beam member 8, said beam member, the depending stems 10 and the check rod 13 being adapted to constitute the usual weighing parallelogram. Surrounding the tops of the openings 12 are gaskets 14 of a yieldable material, which are adapted to engage with the under side of the enlarged head provided at the upper ends of the stem 10, in order to cushion the descent of said stems, to limit the deflection of the beam member from its normal position, and to eliminate shock and jar in the operation of the scale.

Arising from the base 2 is an indicator tower 15, which is suitably secured at its lower end to the top of said base as indicated at 16. The lower end of the tower is provided with registering slots 17, which are formed to receive loosely the transversely extending web 18 which constitutes an integral part of the beam member 8. To the web 18 there is secured an elongated upstanding indicator 19, which projects in an upward direction perpendicularly with respect to said beam member. The lower end of the indicator is provided with an enlarged head 20 exteriorly threaded for the reception of a binding nut 21 which securely clamps and retains the indicator in fixed rigid relationship with respect to the beam member. By this construction it will be seen that the indicator arm will oscillate in unison with the beam member, and since the arm is of very considerable length the extent of oscillation of said beam member will be magnified at the outer or upper end of the indicator. The indicator is adapted to oscillate within the tower 15, and its upper end terminates preferably in an arrow head 22, which is arranged to register with a fixed graduated surface 23 provided in the top of the tower. When the beam member is properly balanced the arrow head 22 is maintained on the zero graduation of the surface 23, and if the beam member is deflected to one side or the other of its balanced normal position, such deflection will be denoted by reference to the relative positions of the indicator with respect to the graduated surface. Preferably, the indicator arm is of such length that its outer end will travel at approximately one inch to every ounce of indicated weight. It will be noted that by this construction the indicator is in effect a unitary part of the beam member, and there are no relatively movable connections between the beam member and indicator to effect the actuation of the latter. This is of major importance in eliminating wear and friction from a scale of this type.

To maintain the beam member and the indicator in a normal position of balance and to provide an easy operating frictionless structure, the head 20 is provided with a depending metallic strip 24 which is securely mounted in a slot provided in the head 20. To the lower end of the strip 24 there is secured the upper end of a coil spring 25, which has its lower end connected to a screw 26 carried in connection with the depending tubular extremity 27 of the saddle casting 4. This saddle casting terminates in a bifurcated portion 28, between the furcations of which the check rod 13 is pivotally mounted as at 29. It will be seen that by the provision of the spring 25 and the strip 24 means have been provided exerting an influence on the beam structure and consequently the indicator to maintain the latter part in a desired position of balance and, also, to yieldingly resist movement of the beam structure from this desired or normal position of balance. The construction, however, of the strip and the coil springs 24 and 25 respectively do not cause the introduction of frictional losses into the operation of the scale, but operate easily and positively under all fluctuating conditions of temperature to retain the beam and indicator in such normal positions. Moreover, the resilient strip and spring construction is of very practical, strong and durable design and is not apt to become broken, strained or to require replacement and adjustment. Other scales of this type frequently employ torsional strips and metallic straps to effect the operation of the indicator and to maintain the beam normal. Experience has disclosed, however, that such metallic straps and torsional strips after relatively short periods of use tend to fracture, break or become out of order. These difficulties have been practically eliminated by the design herein disclosed.

Another feature of importance in the present invention is the provision of a dash pot 30, mounted in the tower 15 for the purpose of dampening or arresting the vibration of the beam structure following the application of weights thereto, in order to accelerate the period required to bring the beam to a desired position of balance, and to enable the scale to be quickly read when subjected to rapid and successive weighing operations. My improved dash pot construction consists of a casing 31 which rests upon an arcuate projection 32 integrally formed with one of the side walls of the tower 15. The casing is divided internally into a liquid receiving compartment 33 and a splash compartment 34 by means of an arcuate divisional wall 35, and the top of the casing is closed by a horizontal upper wall 36. Both of the walls 35 and 36 are provided with longitudinally disposed slots 37, registering loosely receive an angularly bent arm 38 which is fixed to the intermediate portion of the indicator 19 as at 39. The outer or lower end of the arm 38 is provided with a paddle 40, which closely conforms to the cross-sectional formation of the lower or liquid compartment 33, but is slightly spaced from the walls thereof to provide for liquid displacement.

It will be seen that as the indicator oscillates the paddle 40 will move in unison therewith, thereby meeting resistance in the form of the liquid confined within the compartment 33. This liquid is displaced rather slowly from one side of the paddle to the other, and due to the time required in effecting this displacement and to the resistances thereby occasioned, a retarding influence is employed to the paddle and consequently the indicator arm which causes the latter to be quickly brought to a state of rest or inertia following the oscillation of the beam member. This construction provides a dash pot wherein there is no frictional rub or contact between relatively movable metallic parts and therefore a uniformly effective resistance is applied to the indicator which positively but gently dampens the oscillation thereof and brings the indicator and the associated beam member to a position of normal equilibrium.

In view of the foregoing description, taken in connection with the accompanying drawing, it will be seen that the present invention provides a scale operating to indicate under and over weights which is characterized by its marked structural simplicity, the compact and deft arrangement of its parts, the absence of mechanical complications and the ease and accuracy with which the parts of the scale can be readily assembled in operative interrelation. The scale has the advantage of being able to operate and indicate perfectly, independently of the relationship of the supporting surface upon which the base of the scale rests with regard to the horizontal. Many scales require castle levelling and the true positioning thereof on a horizontal plane, in the present scale this is entirely unnecessary, as the scale will operate in any position. Another advantage of the construction disclosed resides in the fact that the mechanism will not be deleteriously affected by variations in temperature, the arrangement being such that the springs 25 may expand or contract to normal temperature variations without affecting the position of the beam.

What is claimed is:

1. In a scale, a base, an oscillatory balanced beam pivotally mounted on said base, an indicator mounted to oscillate in unison with said beam, and a coil spring connected with the under side of said beam in alignment with the pivotal axis thereof, the lower end of said spring being connected with said base, said spring serving to maintain said beam and indicator in a normal position of balance and to yieldingly resist deflection of said beam and indicator from said normal position.

2. In a scale, a base, an oscillatory balanced beam pivotally mounted on said base, an indicator fixed to oscillate in unison with said beam, a flexible strip connected with the under side of said beam in the plane of the pivotal axis thereof, and anti-friction means cooperative with the lower ends of said strips to effect flexure of the latter when said beam is deflected to one side or the other of a normal operating position.

3. In a scale, a base, an oscillatory balanced beam pivotally mounted on said base, an indicator extending perpendicularly from approximately the center of said beam and rigidly mounted in connection with said beam to oscillate in unison with the latter, a flexible strip secured to and depending from said beam in approximately the plane of the pivotal axis thereof, and an anti-friction connection between the lower end of said strip and said base tending to flex said strip when said beam is deflected to either side of a normal position.

4. In a scale, a base, said scale being provided with an opening in the top thereof, a saddle casting seated upon said base and including a depending portion arranged to project through the opening into the interior of said base, an oscillatory balanced beam pivotally mounted upon said saddle casting, an indicator extending perpendicularly from approximately the center of said beam and mounted to oscillate in unison therewith, and spring means connected with the under side of said beam in substantially the plane of said indicator and serving to restore said beam and indicator to normal positions following deflection thereof under applied weights, said spring means having connection with the depending portions of said saddle casting.

5. In a scale, a base provided with an opening in the top thereof, a saddle casting positioned upon said base and provided with a depending portion passing through said opening and disposed within the interior of said base, a pivotally mounted balanced beam carried by said saddle casting, weight receivers pivotally carried by the opposite ends of said beam, and a check rod arranged within said base and having the center portion thereof pivotally connected with the depending portion of said saddle casting, the outer ends of said check being pivotally connected with the depending ends of said weight receiver.

6. In a scale, a base having an opening in the top thereof, a saddle casting having a depending portion arranged to pass through said opening and receivable within the confines of said base, a beam pivotally carried by said saddle casting, weight receivers including depending stems pivotally mounted upon the opposite ends of said beam, a check rod having the center portion thereof pivotally connected with the depending portion of said saddle casting and the outer ends thereof pivotally connected with the lower ends of said weight receiver stems, an indicator extending perpendicularly from the center of said beam and adapted to oscillate in unison therewith, and spring means connected with the under side of said beam in substantially the plane of said indicator and operating to maintain said beam and indicator in a normal position, the lower portion of said spring means having connection with the depending portion of said saddle casting.

7. In a scale, a base, transversely spaced bearings carried by said base, an oscillatory balanced beam pivotally mounted in connection with said bearings, an indicator arm extending perpendicularly from approximately the center of said beam and mounted rigidly in connection therewith for unitary oscillation, a casing surrounding said indicator arm, and means carried in connection with said casing and cooperative with said indicator arm to dampen the vibratory movement thereof.

8. In a scale, a pivotally mounted balanced beam, an indicator arm secured to said beam in approximately the plane of the pivotal mounting thereof, said indicator arm being arranged to oscillate unitarily with said beam, a liquid containing reservoir, and a member fixed to said indicator and arranged for travel within said reservoir, said member being spaced from the walls of said reservoir.

In testimony whereof I affix my signature.

NATHAN A. HALLWOOD.